Figure 1:
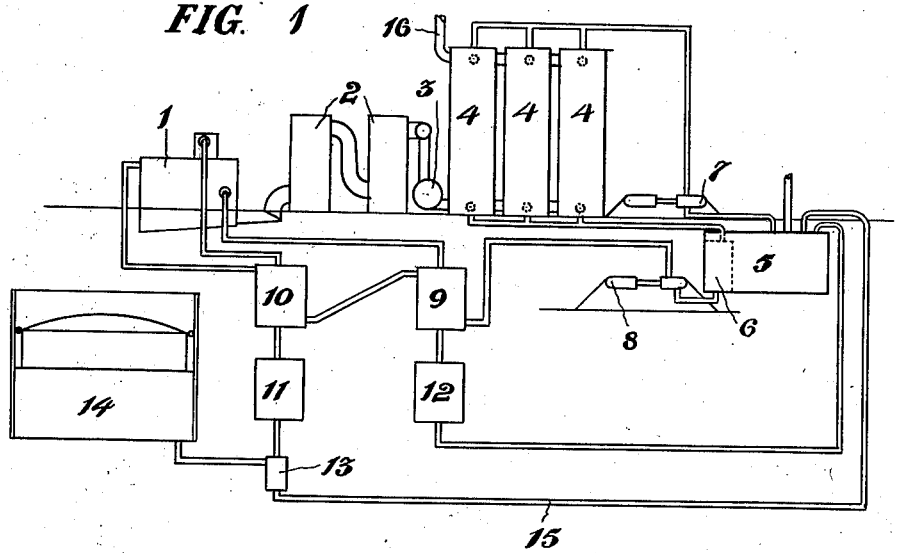

A. E. KNOWLES.
PROCESS FOR THE MANUFACTURE OF CARBONIC ACID GAS.
APPLICATION FILED JULY 30, 1907.

963,586.

Patented July 5, 1910.
2 SHEETS—SHEET 1.

WITNESSES:
W. H. Berrigan.
F. H. Logan.

INVENTOR.
ALBERT EDGAR KNOWLES
BY Van Oldenneel & Schoenlank
Attorneys.

A. E. KNOWLES.
PROCESS FOR THE MANUFACTURE OF CARBONIC ACID GAS.
APPLICATION FILED JULY 30, 1907.

963,586.

Patented July 5, 1910.
2 SHEETS—SHEET 2.

UNITED STATES PATENT OFFICE.

ALBERT EDGAR KNOWLES, OF SUTTON COLDFIELD, ENGLAND.

PROCESS FOR THE MANUFACTURE OF CARBONIC-ACID GAS.

963,586.  Specification of Letters Patent.  Patented July 5, 1910.

Application filed July 30, 1907. Serial No. 386,252.

*To all whom it may concern:*

Be it known that I, ALBERT EDGAR KNOWLES, a subject of the King of Great Britain, and residing at "Gable End," Anchorage Road, Sutton Coldfield, in the county of Warwick, England, chemical engineer, have invented certain new and useful Improvements in Processes for the Manufacture of Carbonic-Acid Gas, of which the following is a specification.

My invention relates to a process for the manufacture of carbonic acid gas and has for its object the effecting of considerable economy in manufacture while giving a product of the best quality.

The process most generally used at present is based on the well known property of an alkaline liquid, or "lye" (or "ley")—by which is meant, hereinafter, an aqueous solution of potassium or sodium carbonates—of absorbing carbon dioxid at normal temperatures and giving it off again on boiling, the lye being ready for absorption of the dioxid again after cooling. The combustion of fuel—say coke—is effected to give the carbon dioxid and the heat generated by this combustion is largely in excess of that required for the decomposition of the bicarbonated lye, so that only the amount of fuel necessary to give the required weight of $CO_2$ should be required. In practice considerably more than the theoretical amount of fuel is of course used, and it is in this direction that economy has been sought but use shows that the economy of fuel may be obtained at the sacrifice of the purity of the product or by greatly increased maintenance charges.

The most successful works have been those in which the product is maintained at a very high state of purity (particularly without any trace of smell caused by the presence of sulfureted hydrogen and other compounds) and where also the plant has been of a very simple nature, thus obviating risk of breakdown and keeping down maintenance charges. Such a plant consists of a boiler or decomposer fired direct with coke and having a fan draft; the fans drawing the products of combustion through suitable washers to remove sulfur, soot, and other impurities and to cool the gases. The gases are then forced up through towers filled with hard coke and in these towers are brought into contact with cold alkaline lye pumped into the towers at the top. In the passage down the coke columns the lye absorbs carbon dioxid from the gases passing up the columns, and the carbonated lye is pumped from the bottom of the towers to the boiler. On its way to the boiler the carbonated lye is passed through pre-heaters generally in the form of heat inter-changers comprising a portion where the cold lye is partially heated by the hot lye, leaving the boiler, and a portion where the lye is further heated by the hot gas, carbonic acid and steam coming from the boiler. The carbonated lye is thus at or near the boiling point as it enters the boiler and when in the boiler distillation and decomposition take place under some small pressure above atmospheric pressure. In the lye circuit coolers are provided to further cool the lye passing from the preheater to the top of the towers; and coolers are provided for the gas as it leaves the lye heaters for completely cooling it down and for condensing the steam it contains. This then is the most successful form of plant, its economy being due to its simplicity and reliability while giving a thoroughly good product. But at no point is this plant efficient; the carbonated lye is never saturated in the absorption part of the plant, nor is it completely decomposed in the decomposing portion, the composition of the gases passing into the absorption towers is not constant and the gases passing out through the towers are not nearly completely decarbonated, still containing a large proportion of the original carbon dioxid; finally an immense waste of heat takes place in the washers, in cooling the products of combustion from the boiler in the gas cooler and in the lye coolers, particularly in the gas cooler.

It has been recognized that the richer in carbonic acid gas and the more constant are the products of combustion used in the absorbing towers, the greater the amount absorbed. Also that pressure greatly assists this absorption. Attempts at economy have therefore been made in two directions. First, by the production of fuel gas in some form and by its combustion obtaining a more constant and richer quality of gas. And, secondly, by the absorption of the carbonic acid gas under higher pressure. This latter has been carried out in two ways, first, by the mechanical compression of the gas passing into the absorbing chambers, and secondly, by using the fuel gas in a gas engine, and using the exhaust products at the exhaust pressure or subsequently compressing before passing into the absorbing vessel. As already mentioned, these attempts at economy have introduced or aggravated other difficulties, particularly have they increased maintenance charges, both for wear and labor and what is more serious have affected the quality of the product. These results have been due to the increased complication of the plant at the very place where wear and corrosion are the greatest, and the production of intermediate hydro-sulfur and hydro-carbon compounds, impossible to remove from the products of combustion used. In the plant described as giving good results in good practice, with direct coke fired boilers such products are practically impossible, particularly if the percentage of carbonic acid gas is not forced too high. The sulfur impurity is under these conditions sulfur dioxid which presents no difficulties in its removal and cannot contaminate the final product, as any not removed in the washers is combined with the lye due to the presence of nitric acid, forming a sulfate which will not be decomposed by heat.

In investigating the conditions and methods of manufacture of carbonic acid gas, I have found that in many points the known laws governing the operations are ignored by makers and that certain of the conditions ignored are conducive to economy in the production of a satisfactory product, and my invention consists in a method of manufacture embodying and applying certain of these conditions without complicating the necessary apparatus. The conditions are:—

1. Combination of the lye and carbonic acid gas is produced either by low temperature or high pressure.

2. Decomposition of carbonated lye is effected by either high temperature or low pressure.

3. That with any fixed sample of lye and free carbonic acid gas, there is a fixed temperature corresponding to a fixed pressure at which no reaction takes place. That this temperature rises rapidly with the pressure giving a curve of neutral points. And that any departure from these fixed figures produces reaction for example, at fixed pressure decomposition occurs above this neutral temperature, and combination below, the neutral temperature, or for a fixed temperature, pressure above the neutral effects combination; below effects decomposition.

4. That decomposition will continue under the conditions given so long as the carbonated lye is not completely decarbonated and absorption will continue so long as the carbonated lye is not saturated and there is still carbonic acid gas to absorb.

5. That the neutral points are not materially affected by the percentage of carbonic acid in the solution or of the gases in contact.

6. But that the neutral points are altered altogether if the basic contents of the solution are altered, that is to say, if the solution of the alkali is strengthened or weakened.

7. That a weaker alkali liquid decomposes at lower temperatures or higher pressures and similarly combines at lower temperatures and higher pressures than a stronger liquid.

8. That the amount of heat required to effect decomposition is constant and is exactly equal to the amount of heat produced during absorption and is not altered by the temperature at which the processes are carried out. In fact (although probably not economical) it would be quite possible to carry out the reactions without using any of the heat from combustion.

Of these conditions only the first appears to have met with any recognition from designers of plants and this has led to the employment in some cases of absorption under pressure which viewed from the question of economy is a doubtful improvement.

What appears from experiment to be of the utmost importance is the fact that temperature differences can be reduced or even obviated by the effecting of the decomposition of the carbonated lye under reduced pressure and this has been completely lost sight of and this I make one of the essential features of my process. In connection with this I may mention that with a sufficiently high vacuum it is possible to decompose the carbonated lye at normal temperature, but in practice it probably would not be economical to so work.

The facts in paragraphs 5, 6 and 7, have also been lost sight of and these I utilize in my process with very great advantage, the taking up of the dioxid in the solution and the giving it up again being considerably facilitated by the strengthening of the solution in the absorption part of the apparatus and the dilution of the solution in the decomposing portion. As this may be very readily effected without complication a large gain is made.

My process therefor consists, first, in varying the strength of the alkali solution between the decomposing and absorbing portions of the plant, that is effected by a weakening or dilution of the solution in the decomposer; and, secondly, in the employment of this variation of the strength of the solution in conjunction with a reduction of pressure or a partial vacuum in the decomposer. Both these features may be carried out in numbers of ways; as an example, the first mentioned feature may be carried into practice as follows. The pump now used for forcing the lye to the boiler may be dispensed with and one pump for drawing the lye from the boiler and forcing it to the top of the towers only used. The boiler would then be on the suction side only of a pump, boiled lye being drawn out and circulated while the carbonated lye would be drawn in by the partial vacuum created. The gas holder for the carbonic acid gas could also be dispensed with, the gas being drawn direct by the compressor used for the subsequent liquefaction of the gas in charging the cylinders in which it is commercially handled. The second feature can be effected by utilizing the water of condensation from the gas coolers and make up water, that is, water replacing that boiled out, for the dilution of the alkaline liquid before it goes to the boiler. The amount of this would be varied according to the amount boiled off with the gas from the boiler.

As is shown by the above laws, it is of great advantage to have the carbonated lye in the boiler for a considerable time without pressure and in designing apparatus to carry out my process I prefer to employ means for effecting this in the decomposing apparatus.

What I effect is a great saving in heat and a large reduction of the waste in unabsorbed carbonic acid gas. It may be that in practice it would not be economical to completely absorb the carbonic acid gas although the laboratory shows this possible, but such a thing can only be regulated and determined as to which is the best in practice. It must be understood that I do not aim at the lye being completely saturated or decomposed at any point of the apparatus, but at greatly facilitating these to give a better and more economical manufacture.

In order that my invention may be particularly understood and easily carried into practical effect, I have appended hereunto 2 sheets of drawings on which:—

Figure 2:
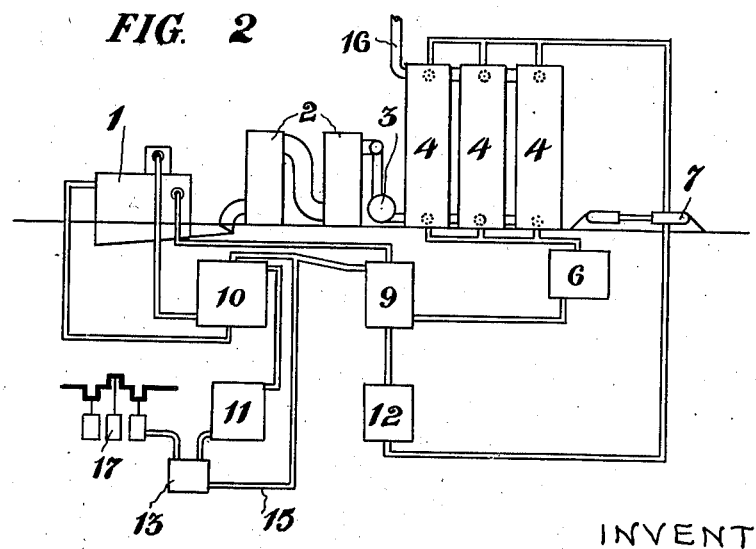
Figure 3:
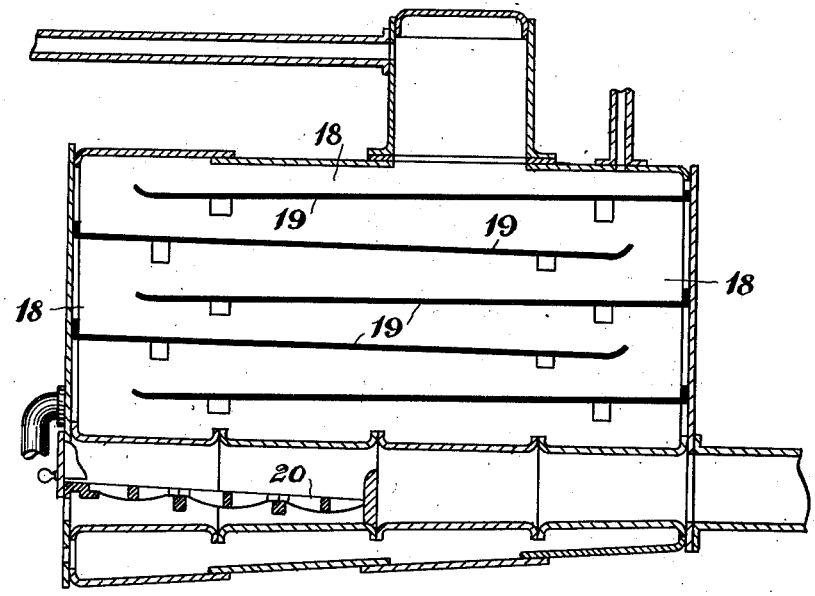

Figure 1. is a diagrammatic view of a common type of plant. Fig. 2. is a similar view showing how this type of plant would be modified to effect my process. Fig. 3. is a suitable decomposing apparatus for giving the best practice of the process.

On the drawings at Fig. 1, 1 is the carbonated lye boiler, 2 the flue gas washers, 3 blowers, and 4 absorption towers. A decarbonated lye tank is represented at 5 and a tank for the carbonated lye at 6. 7 is a pump for forcing the decarbonated lye from the tank 5 to the towers 4, while 8 is a pump for forcing the carbonated lye from the tank 6 to the boiler. Heat interchangers and gas coolers are arranged in the way of the gas and the lye; 9 is a heater in which the carbonated lye, on its way to the boiler, is partially heated by the hot decarbonated lye passing from the boiler to the tank 5. 10 is a heater in which the carbonated lye, passing to the boiler, is further heated by the gas leaving the boiler on its way to final gas cooler 11, while 12 is the final lye cooler for the decarbonated lye, after leaving the carbonated lye heater, 10. 13 is a separator for condensed steam, 14 is the gas holder, and 15 the path of the water from the separator. In this plant, which is the type before mentioned as being the most generally satisfactory, the boiler is fired direct with coke and the products of combustion pass through the washers 2 to the towers 4. The decarbonated lye from the boiler passes through the carbonated lye heater 9, where it gives up part of its heat to the carbonated lye, on its way to the boiler, then passes to the cooler 12 and thence to the decarbonated lye tank 5. From the tank 5 the decarbonated lye pumped to the towers where it meets the gas and absorption takes place. The flue gases not absorbed pass out at the flue 16 while the carbonated lye goes to the tank 6 then to the heaters 9 and 10 and thence to the boiler 1. The carbonic acid gas boiled out of the lye passes to the carbonated lye heater 10 then to the final cooler 11 and through the separator 13 where it is cleared of steam, to the holder 14 from which it is led to the compressor as required.

In the plant as altered to carry out my process the pump 8 for forcing the carbonated lye to the boiler is dispensed with, the pump 7, for drawing the decarbonated lye from the boiler and raising it to the top of the towers, being used alone. The boiler is on the suction side of this pump, boiled lye being drawn out and circulated while the carbonated lye would be drawn in by the partial vacuum created. The gas holder 14 can also be dispensed with and the gas drawn direct by the compressor effecting the liquefaction of the gas for commercial use. In this case the boiler 1, heaters 9 and 10 and coolers 11 and 12, are under reduced pressure produced by suction of the lye pump 7 and the gas compressor 17. The water of condensation and make up water from the coolers instead of passing to the decarbonated lye tank 6 is utilized for diluting the carbonated lye, and may be added at 10.

The preferred form of boiler is shown at Fig. 3 in cross-section. It comprises a square or other vessel, 18, with a number of superimposed trays 19. These trays, 19, are of a size to allow the carbonated lye passing successively over them to decompose. They are arranged as shown, so that the final boiling takes place at the bottom of the vessel. In the case shown, the heating is effected by direct heat from the furnace 20, but other heating device may be substituted for or used in addition to the furnace 20.

These drawings are by way of example only as the process may be effected by various forms of plants, as will be readily understood.

I claim:

1. The process of manufacturing carbonic acid gas, which consists in carbonating an aqueous solution of a carbonate of an alkaline metal, diluting the same, and then decarbonating the resulting solution.

2. The process of manufacturing carbonic acid gas, which consists in carbonating an aqueous solution of a carbonate of an alkaline metal, diluting the same, and then decarbonating the resulting solution under reduced pressure.

3. The process of manufacturing carbonic acid gas, which consists in carbonating an aqueous solution of a carbonate of an alkaline metal, varying the strength of the same between the decomposer and absorber, and effecting the decomposition of the resulting solution under decreased pressure in the decomposer.

4. The process of producing carbonic acid gas, which consists in carbonating to the saturation point an aqueous solution of a carbonate of potassium, diluting the same, and decarbonating the resulting solution under a decreased pressure.

5. The process of producing carbonic acid gas, which consists in carbonating an aqueous solution of a carbonate of an alkaline metal, diluting the solution, passing the liquid over a series of trays in contact with evolved hot gases and decarbonating the liquid under reduced pressure.

6. The process of manufacturing carbonic acid gas, which consists in carbonating an aqueous solution of a carbonate of potassium until there is formed the bi-carbonate, diluting the solution thus carbonated, and then decarbonating the same under reduced pressure.

In testimony whereof, I, ALBERT EDGAR KNOWLES, have signed my name to this specification in the presence of two subscribing witnesses, this 17th day of July 1907.

ALBERT EDGAR KNOWLES.

Witnesses:
F. G. BRETTELL,
ERNEST HARKER.